United States Patent [19]

Gunzel, Jr. et al.

[11] 4,071,170
[45] Jan. 31, 1978

[54] PORTABLE MOTOR DRIVEN DUSTING APPARATUS

[75] Inventors: Rudolph M. Gunzel, Jr., San Marino; Tony Radecki, Altadena, both of Calif.

[73] Assignee: Meiko, Inc., Los Angeles, Calif.

[21] Appl. No.: 644,608

[22] Filed: Dec. 29, 1975

[51] Int. Cl.² .................................... B67D 5/54
[52] U.S. Cl. ........................ 222/193; 222/199; 366/128
[58] Field of Search .............. 222/193, 199, 200, 201, 222/229, 231–233, 235, 196; 259/DIG. 42

[56] References Cited

U.S. PATENT DOCUMENTS

| | | | |
|---|---|---|---|
| 2,892,286 | 6/1959 | Martin | 222/193 |
| 2,957,268 | 10/1960 | Santafelli | 222/193 |
| 2,961,129 | 11/1960 | Bullock | 222/193 |
| 3,276,162 | 10/1966 | Chester | 222/193 |
| 3,286,991 | 11/1966 | Pellegatti | 259/DIG. 42 |
| 3,407,972 | 10/1968 | Cymbalisty | 222/193 |

FOREIGN PATENT DOCUMENTS 651,407  4/1951  United Kingdom ................ 222/193

*Primary Examiner*—Robert B. Reeves
*Assistant Examiner*—H. Grant Skaggs
*Attorney, Agent, or Firm*—George J. Netter

[57] ABSTRACT

Powdered material such as insecticide or the like is moved from a hopper by the combined effect of gravity, vibration and induction of a rotary blower for distribution as a gas-powder suspension. The element for vibrating the powder is driven by the blower to induce vibrations in the material along a plurality of different directions. Alternate versions include a canister of material removably located in the hopper, and a container that replaces the hopper and is removably secured to the apparatus.

17 Claims, 11 Drawing Figures

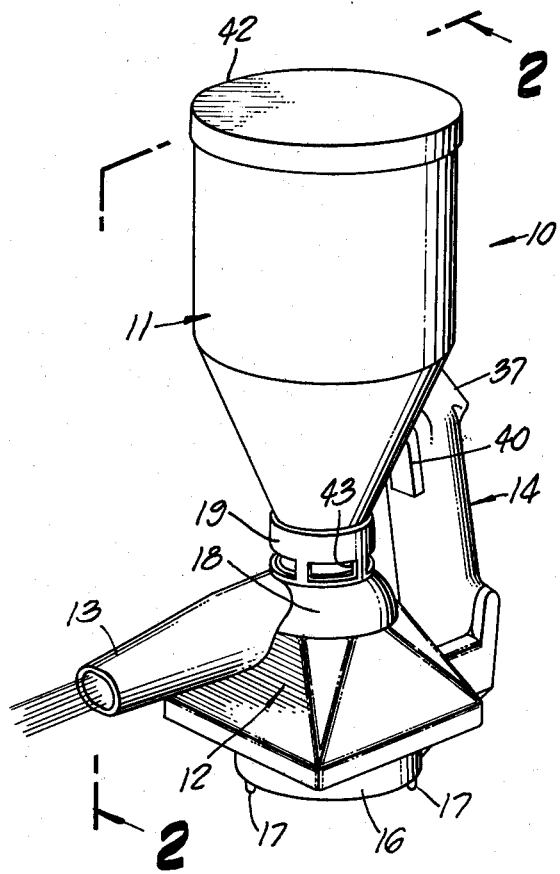
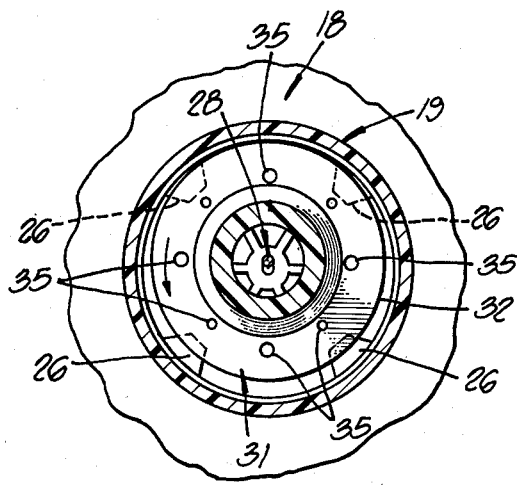
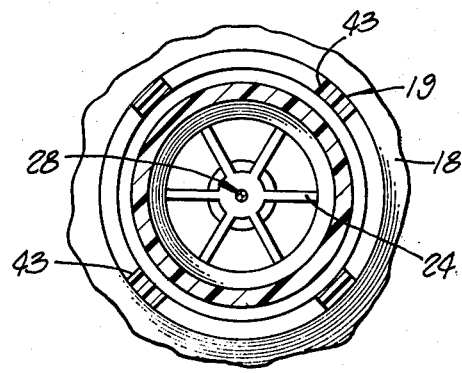
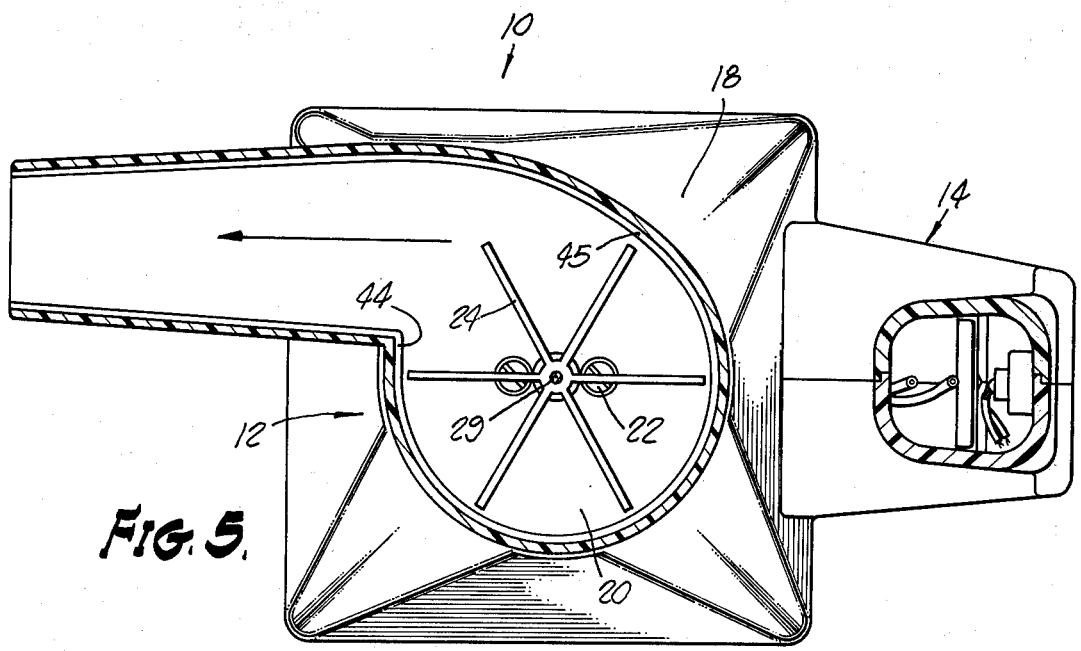
FIG. 1.
FIG. 3.
FIG. 4.
FIG. 5.

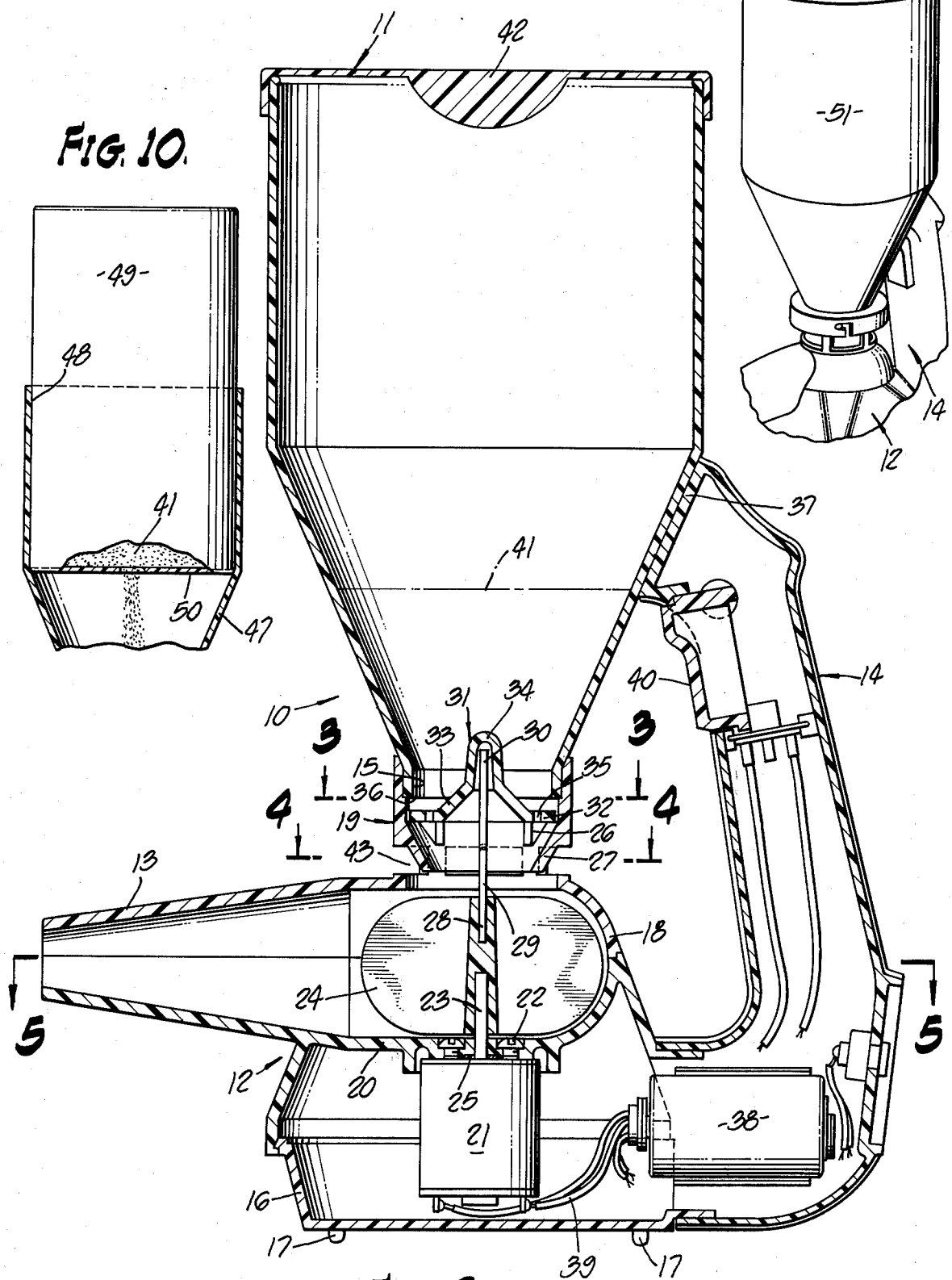

PORTABLE MOTOR DRIVEN DUSTING APPARATUS

The present invention relates generally to dusting apparatus, and, more particularly, to portable, motor-driven apparatus for the dispensing of pulverulent materials, for example, insecticides, fungicides or the like.

BACKGROUND OF THE INVENTION

Known apparatus for dispensing powdered material such as insecticides or fungicides possess a number of disadvantages both in construction and operation which tend to make their use difficult or complex and their operation inefficient. For example, one class of such apparatus is operated by hand power and these not only tend to be somewhat heavy and clumsy to operate, but also the distribution of the material is non-uniform, depending as it does on the speed and uniformity with which the user operates the equipment. As to the powered apparatus which are also portable, these have in the past involved the carrying of relatively heavy power packs, making them undesirable for certain types of use.

In all of the known equipment, whether hand operated or powered, a recurring problem is that of bridging of the powdered material in the container or hopper. That is, depending upon the cohesive characteristics of the material, an air pocket tends to develop in the hopper in the region adjacent the exit point therefrom, at which time the apparatus dispenses air with very little of the powdered material suspended therein. Then, upon subsequent collapse of the material surrounding the air pocket, the density of suspended material in the emitted air will be suddenly increased beyond what may be the desired amount for which the apparatus was designed. In the matter of dispensing insecticides and fungicides, this changing rate of dispensing is undesirable for the further reason that the materials are frequently poisonous and it is desirable to only dispense to the plants the required amount and no excess, since the plant in some cases can be harmed by excessive amounts of the material. Also, when the materials used are toxic, it is desirable to maintain a uniform and properly mixed amount to reduce exposure to the user of the equipment.

DESCRIPTION OF THE DRAWING

FIG. 1 is a perspective view of the dusting apparatus of this invention.

FIG. 2 is a side, elevational view of the dusting apparatus of FIG. 1 taken along the line 2—2 of FIG. 1.

FIG. 3 is a plan, sectional view taken along the line 3—3 of FIG. 2.

FIG. 4 is a further plan sectional view below that of FIG. 3 and taken along the line 4—4 in FIG. 2.

FIG. 5 is still another plan, sectional view taken below FIG. 4 through the blower and handle of the apparatus along line 5—5 of FIG. 2.

FIG. 10 is a sectional, elevational, partially fragmentary view of an alternate form of hopper construction.

FIG. 11 is a sectional, partially fragmentary view of a detachable container for use in another embodiment.

DESCRIPTION OF A PREFERRED EMBODIMENT

Figure 6:
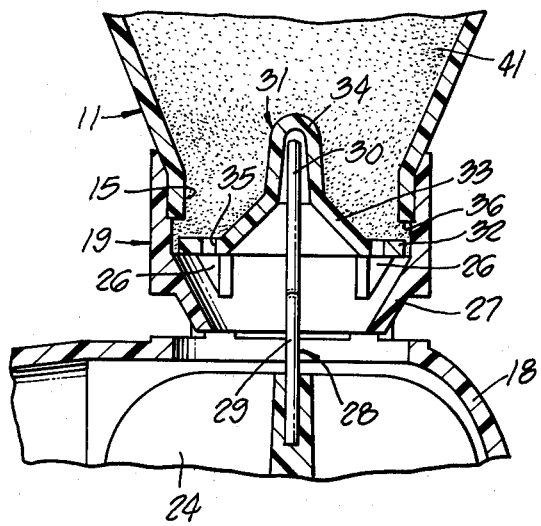
FIGS. 6, 7, 8 and 9 are elevational, sectional, partially fragmentary views showing in sequence the operation of the described apparatus for introducing the powdered material into an air stream.

With reference now to the drawings and particularly to FIG. 1, the dusting apparatus of the invention is seen identified generally as 10 and includes in its major elements a hopper 11 containing the powdered material to be dispensed, a housing 12 containing means for transferring the powdered material from 11 into a pressurized stream of air, an outlet nozzle 13 and a handle 14, the latter removably interconnected with the housing 12 and supportingly related to the hopper 11. The dusting apparatus 10 includes, in a way that will be more particularly described, an electric motor for providing the necessary rotative power, and a battery pack unitarily related to the handle 14 for energizing the motor. In a preferred form the handle and included battery pack are selectively removable from the remainder of the apparatus as a unit.

Turning now also to FIG. 2, the container 11 is seen to be a hollow enclosure, having an open-mouth lower end 15 which is received within a suitably dimensioned opening in the housing 12 and secured therein in any of a number of known ways.

The housing 12 is seen to be a thin-walled, hollow construction and includes a generally cylindrical base 16 with a flat bottom and feet 17 on which the entire apparatus can supportively rest; a central body portion 18 with the tapered outlet nozzle 13 extending laterally therefrom; a generally cylindrical inlet port assembly 19; and the handle 14, one end of which is removably interconnected with the base 16 and the base portion 18, and the other end supportingly abuts against the container 11.

The body portion 18 includes a wall 20, to the lower surface of which is affixed an electric motor 21 via screws 22 or other suitable means. The motor shaft 23 extends upwardly through the wall 20 into the cavity of the housing and is drivingly connected to a blower 24. A seal 25 isolates the motor from the powdered material.

The inlet port assembly 19 is a hollow tubular construction axially aligned with the motor shaft and extending from the housing central body portion 18 for fitting receipt about the open end of container 11. More particularly, the port assembly is preferably integral with the housing body portion 18 and has a plurality of shoulder supports 26 on its inner wall surface equally spaced thereabout and inwardly of the port assembly upper end. Immediately adjacent and inwardly of the shoulder supports 26 is a continuous skirt 27, sloping inwardly toward the cylindrical axis of 19 a limited amount. A plurality of openings are formed through the side wall of 19 behind the skirt 27.

Figure 7:
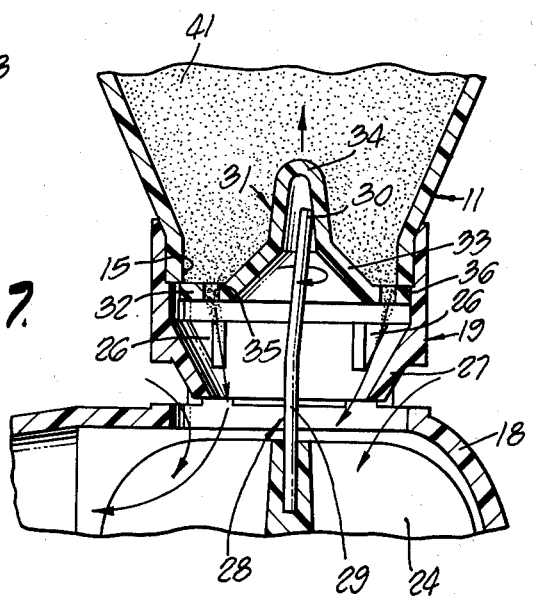
Figure 8:
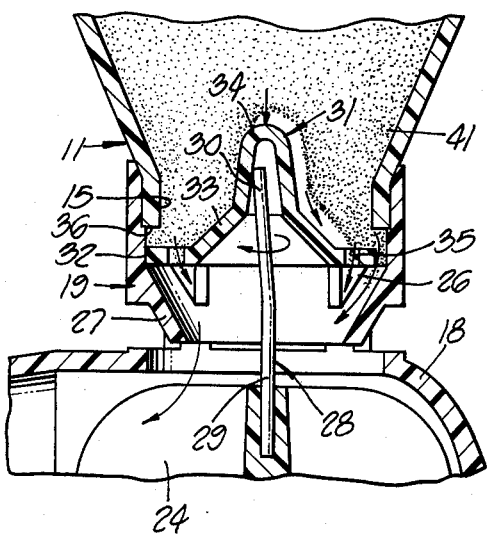
Figure 9:
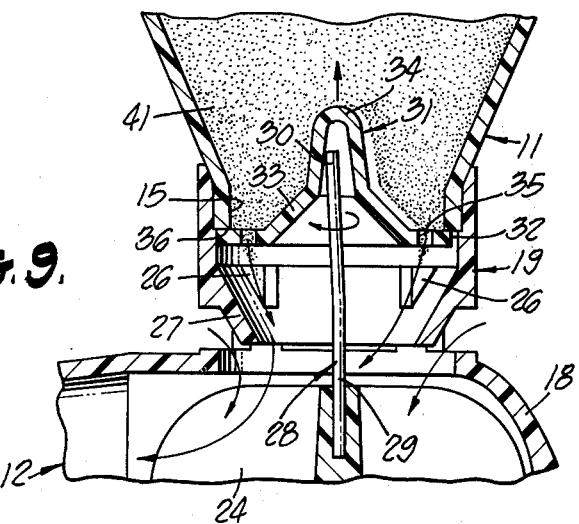

A further drive shaft 28 is affixed to the upper end of the blower 24 at its axis of rotation and extends upwardly to approximately the upper end of the cylindrical inlet port assembly 19. The drive shaft has a first portion 29 coaxial with shaft 23 and an outer end portion 30 that is formed out of parallelism with the first portion 29 (cf. FIGS. 7-9). On rotation of the blower by the motor 21, the upper end of the drive shaft moves in a circular path or "wobbles" for a purpose to be more clearly described.

Referring now also to FIGS. 6-9, a valving element 31 is located slightly spaced from the upper end of the shaft 28 and, in a way that will be more particularly described, the wobbling motion of this shaft causes the element to vibrate or oscillate both transversely and longitudinally of the shaft, serving to promote downward flow of the pulverulent material from the container and to prevent undesirable bridging of the material within the container. The valving element is a thin-walled construction of overall circular geometry as seen in plan (FIG. 3). In elevation, the valving element has a flat, annular outer edge margin 32, a conical portion 33 just inwardly of the edge margin, and a central, conical, dome-shaped portion 34 within which the shaft 28 is loosely received. The motor 21 and drive shafts 23 an 29 together form a driving means for the valving element 31.

The outer diameter of the valving element is substantially less than the inner diameter of the port assembly 19 (e.g., 1 7/16 inches diameter as compared to a port inner diameter of 1½ inches), and yet large enough so that the element can rest on the shoulder supports 26 and is not able to move therepast. The element margin also includes a plurality of openings 35 passing completely therethrough, preferably spaced uniformly about the periphery, and although other geometries and arrangements may be found satisfactory, these openings have been found especially advantageous when circular and of two different sizes (FIG. 3). Moreover, as is best seen in FIG. 2, the inner diameter of the container opening 15 is less than the inner diameter of the inlet port which forms a continuous shoulder 36 spaced from the shoulder supports 26. The relative dimensions of the valving element are such that when it is moved along the longitudinal axis of the inlet port, the shoulder supports 26 and shoulder 36 serve as limit stops.

Still referring to FIG. 2, the handle 14 is seen to be hollow and generally L-shaped, with its lower end removably connected to the base 16 and central body portion 18. The upper end of the handle is formed as at 37 to supportingly abut against the side of hopper 11 when it is in place on the apparatus. One or more rechargeable batteries 38 are mounted within the handle, and electrical interconnection with the motor 21 via wiring 39 is under the selective control of a finger actuated switch means 40, the batteries forming a power pack for energizing the motor.

For the ensuing discussion of the operation and use of the apparatus described to this point, reference is made simultaneously to FIGS. 2 and 6-9. First, the hopper 11 is provided with a supply of pulverulent material 41 to be dispensed or distributed by removing the cover 42 and filling, and then replacing the cover. Actuation of the switch means 40 energizes the motor 21, causing the blower fan to rotate and the upper end of shaft 28 to move in a circular path or "wobble". This eccentric shaft movement imparts a horizontal reciprocatory motion to the valving element along with a slow rotation of the element about the shaft. Also, due to the conical shape of the portion 34 and the cant of the upper end portion 30 of the shaft 28, as the shaft rotates the element 31 is moved upwardly from the FIG. 6 position to the position shown in FIGS. 7-9. Actually, the upward movement of the element is not only a vertical oscillation of the element within the confines of the shoulder stops 26 and continuous shoulder 36. The combined effect of the valving element vibration, both vertical and horizontal, directly on the powdered material and indirectly via the container wall, enhances the gravity induced downward material flow. It has been found that the major downward flow path of the powder is outwardly of the element marginal edge, with a lesser amount passing through the openings 35. The vibratory energy imparted to the powder also prevents bridging, caking and sticking to the container inner walls.

The powder, on moving down past the vibrating valving element, is entrained within air drawn through the openings 43 by the blower, and the powder suspension is expelled as a pressurized stream from the nozzle 13. Although beneficial results are believed obtained at lower speeds, best operation to date has been achieved with a motor rotating at, preferably, 8,000 rpm or more.

As is best seen in FIG. 5, the blower 24 outer edges are located very closely to the housing inner wall from the point 44 at the juncture with the nozzle inner wall, to a point 45 approximately 225° away. Thereafter, the housing wall and nozzle wall rapidly fall away from the blower edges. More particularly, the blower outermost edges extend just beyond the nozzle bore centerline, but short of 0.75 of the bore diameter. In this manner, the blower acts as a centrifuge and the powder buildup against the housing inner wall, as is the case if a substantial space is allowed between the blower blade edges and the housing, it completely avoided. Moreover, it has been found in a practical embodiment that when a blower was constructed as shown in FIG. 5, with the closest spacing from the housing wall being 1/32 of an inch, and with rounded edges as in FIG. 2, an output of 14-15 cubic feet per minute was obtained when only about 10 CFM was theoretically indicated as achievable. Still further, this construction insures a uniform powder suspension being continuously emitted from the nozzle during use, and self-purging eliminates the need for cleaning before use of a different powdered material.

FIG. 10 shows an alternate form of the invention in which the hopper 47 has similarly dimensioned lower parts to those of the hopper 11 for receipt into the housing 12, but otherwise includes an open top 48 into which a canister 49 of the powdered material 41 is received. It is contemplated that, in the usual situation, the user of the described equipment may have several different canisters 49, each containing a separate insecticide, fungicide or other powdered material which will be stored at a convenient location. At the time it is desired to dispense or distribute the powdered material, the particular canister desired will then have its lower end 50 opened and fittingly inserted into the open end 48 of the hopper 47. On completion of a dusting opertion, the canister is removed, capped and stored, and the dusting apparatus itself is then conveniently stored. The dimensions of the canister are such that it will fit tightly within the hopper, allowing practically no air to pass therebetween, so that maximum effectiveness of the blower for drawing the powdered material downwardly through the inlet port is achieved.

As a further embodiment, reference is made to FIG. 11. As shown there, in place of the hoppers 11 and 47 of the first and second described versions, an otherwise closed container 51 has an opening at one end which is removably secured to the inlet port assembly by threads, a so-called bayonet connection, or other such means. These containers may be the original container in which the material is provided by the manufacturer, for example.

The purpose of using different sized openings 35 in the valving element (FIG. 3) is to obtain good material feed for materials of different particle size. That is, in practical use the described apparatus would desirably accommodate materials of substantially different particle size. If merely the largest sized openings were retained, then the smaller sized material would flow too quickly. By having openings of different diameters, a range of particle sizes can be accommodated and still maintain desirable flow rates.

In the practice of the present invention, there is provided apparatus for distributing or dispensing a powder suspended in a pressurized stream of gas in which the powdered material is moved from a hopper or container by the combined effect of gravity, vibration and induction of pressurized air, in proportional amounts into the central portion of a rotary blower. Then, the gas-powder suspension is moved along a velocity increasing nozzle for ultimate emission as a highly pressurized stream.

We claim:

1. Dusting apparatus, comprising:

a hopper of powdered material having an exit opening;

a housing including an inlet port, an outlet and a chamber in communication with both said port and said outlet, the exit opening of said hopper being received in communication with said inlet port;

a rotary blower in said chamber; and a valving element freely supported in said inlet port having convex portions facing into the hopper exit opening and concave portions facing oppositely;

driving means intermittently contacting said concave portion of said element and interconnecting said rotary blower and said valving element for vibrating said element in two directions at substantially ninety degrees to one another on rotation of said blower.

2. Apparatus as in claim 1, in which the element is slidingly received in said inlet port between first and second shoulder means within said inlet port.

3. Apparatus as in claim 1, in which there is further provided a selectively removable handle interconnected with the housing including an electric power pack for energizing the driving means and a switch.

4. Apparatus as in claim 1, in which a canister of said powdered material is fittingly received within a further opening in said hopper.

5. Dusting apparatus as in claim 1, in which the driving means interconnecting the rotary blower and valving element includes a shaft mounted on said blower for rotation therewith, an end of said shaft merely contactingly engaging said valving element and vibrating said element of rotation of the blower.

6. Dusting apparatus as in claim 1, in which there is further provided handle means selectively connectable and disconnectable with the housing.

7. Dusting apparatus as in claim 1, in which there is further provided a handle and battery pack unit selectively connectable with said housing for energizing a motor to drive said rotary blower.

8. Dusting apparatus as in claim 1, in which said valving element convex portions include a generally disc-shaped body having a dome-shaped central portion and adjacent sloping sides, the overall dimensions of said valving element being substantially less than the inlet port dimension; and said driving means including a shaft having one end eccentrically arranged with respect to the blower axis of rotation within the valving element dome-shaped central portion such that on rotation of the blower said valving element vibrates.

9. Dusting apparatus as in claim 8, in which said valving element includes at least one opening formed therein.

10. Dusting apparatus as in claim 8, in which said valving element has a plurality of openings of two different sizes therein.

11. Dusting apparatus as in claim 1, in which means are provided for rotating said rotary blower at minimally 8,000 rpm.

12. Dusting apparatus as in claim 1, in which said inlet port includes portions integral with the housing extending outwardly from said housing for connection with said hopper, said wall portions having openings therethrough via which external air is inducted on rotation of the rotary blower.

13. Dusting apparatus as in claim 1, in which the hopper includes a canister of said material fittingly received therein.

14. Dusting apparatus as in claim 1, in which said hopper is removably secured onto said housing inlet port.

15. Apparatus as in claim 1, in which said rotary blower forms a pressurized gas stream and induces said powdered material into the gas stream, said blower being located in a further housing the inner walls of which are immediately adjacent the blower throughout the major part of its rotation and at a greater distance for the remainder; and a nozzle having a straight bore interconnected with said further housing, the centerline of said bore intersecting at least an end portion of said rotary blower.

16. Apparatus as in claim 1, in which there is further provided a canister frictionally and sealingly received within a further opening in the hopper, said canister having an opening communicating with the hopper interior, but being otherwise sealed.

17. Apparatus as in claim 1 in which said element is disclike and extends generally transversely of said inlet port; and said driving means interconnected with the element including an eccentrically rotating shaft having an end engaged with said disclike element vibrating said element primarily transversely of said inlet port.

* * * * *